United States Patent [19]
Bennin et al.

[11] Patent Number: 5,883,758
[45] Date of Patent: Mar. 16, 1999

[54] LEAD STRUCTURE WITH STAINLESS STEEL BASE FOR ATTACHMENT TO A SUSPENSION

[75] Inventors: Jeffry S. Bennin; Ryan A. Jurgenson, both of Hutchinson, Minn.

[73] Assignee: Hutchinson Technology Incorporated, Hutchinson, Minn.

[21] Appl. No.: 907,154

[22] Filed: Aug. 6, 1997

Related U.S. Application Data

[60] Provisional application No. 60/023,537 Aug. 7, 1996.
[51] Int. Cl.⁶ .............. G11B 5/54; G11B 21/16
[52] U.S. Cl. .................................. 360/104
[58] Field of Search ..................... 360/103–109

[56] References Cited

U.S. PATENT DOCUMENTS

| | | | |
|---|---|---|---|
| 4,819,094 | 4/1989 | Oberg | 360/104 |
| 4,996,623 | 2/1991 | Erpelding et al. | 360/104 |
| 5,296,983 | 3/1994 | Blanc et al. | 360/104 |
| 5,594,607 | 1/1997 | Erpelding et al. | 360/104 |
| 5,597,496 | 1/1997 | Masaichi et al. | 216/94 |
| 5,598,307 | 1/1997 | Bennin | 360/104 |
| 5,680,274 | 10/1997 | Palmer | 360/104 |
| 5,694,270 | 12/1997 | Sone et al. | 360/104 |
| 5,708,541 | 1/1998 | Erpelding | 360/104 |
| 5,734,524 | 3/1998 | Ruiz | 360/104 |
| 5,754,368 | 5/1998 | Shiraishi et al. | 360/104 |
| 5,754,369 | 5/1998 | Balakrishnan | 360/104 |
| 5,757,585 | 5/1998 | Aoyagi et al. | 360/104 |
| 5,781,379 | 7/1998 | Erpelding et al. | 360/104 |
| 5,786,962 | 7/1998 | Kawazoe | 360/104 |
| 5,796,552 | 8/1998 | Akin, Jr. et al. | 360/104 |

FOREIGN PATENT DOCUMENTS

| | | |
|---|---|---|
| 0 764 942 A1 | 3/1997 | European Pat. Off. |
| WO 96/37883 | 11/1996 | WIPO |
| WO 97/31369 | 8/1997 | WIPO |
| WO 97/36290 | 10/1997 | WIPO |
| WO 97/43757 | 11/1997 | WIPO |

*Primary Examiner*—Jefferson Evans
*Attorney, Agent, or Firm*—Faegre & Benson LLP

[57] ABSTRACT

A lead structure adapted for attachment to a metal disk drive head suspension of the type having a mounting region on a proximal end, a head-receiving flexure on a distal end, a rigid region and a spring region between the rigid region and the mounting region. The lead structure is formed from a laminated sheet of material and includes a copper conductor layer and a stainless steel base layer bonded together by a polyimide insulating layer. The conductor layer includes a plurality of transversely spaced, elongate electrical conductors adapted to extend between the flexure and mounting region of the head suspension. The metal base layer includes flexure mounting, rigid region mounting and mounting region mounting sections having tabs which are adapted to be welded to the head suspension. At least portions of the conductor layer which traverse the flexure and spring regions of the head suspension are free from the metal base layer.

24 Claims, 6 Drawing Sheets

LEAD STRUCTURE WITH STAINLESS STEEL BASE FOR ATTACHMENT TO A SUSPENSION

REFERENCE TO RELATED APPLICATION

This application claims the benefit of U.S. Provisional application Ser. No. 60/023,537 filed on Aug. 7, 1996.

BACKGROUND OF THE INVENTION

1. Field of the Invention

The present invention relates generally to head suspensions for rigid magnetic disk drives. In particular, the present invention is a lead structure with a stainless steel base which is manufactured separately from and configured for subsequent attachment to the head suspension.

2. Description of the Related Art

Head suspensions for supporting read/write head sliders above the rotating media in magnetic disk drives are in widespread use and disclosed generally in the Christianson et al. U.S. Pat. No. 5,461,525. Head suspensions of this type typically include a stainless steel (spring material) load beam having a mounting region on a proximal end, a rigid region having stiffening rails on its opposite sides, and a radius or spring region between the rigid region and mounting region. A gimbal or flexure is located on the distal end of the load beam. In the embodiment shown in the Christianson et al. Patent, the flexure is manufactured and formed separately from the load beam and subsequently mounted to the load beam. Other types of head suspensions such as those shown in the Blaeser et al. U.S. Pat. No. 5,198,945 include what is known as an integral gimbal which is formed directly on the distal end of the load beam. The mounting region of the head suspension is adapted to be mounted to a rotary actuator in the disk drive, and typically has a base plate welded thereto for added rigidity.

A read/write head slider is mounted, usually by adhesive, to the flexure of the head suspension. The read/write head sliders are commonly electrically connected to electronic circuitry in the disk drive by lead wires. The lead wires are ultrasonically bonded, soldered or otherwise attached to terminals on the read/write head slider and extend along the length of the head suspension to the mounting region. Tabs are often included on the rigid region and mounting region to secure the wire leads to the suspension.

Alternatives to head suspensions with conventional wire leads are known as integrated lead or "wireless" suspensions. A number of different types of integrated lead suspensions are commercially available. One such type of integrated lead suspension is disclosed generally in the Bennin U.S. Pat. No. 5,598,307. The suspension shown in this patent is fabricated from a laminated sheet of material including a stainless steel spring material layer and a copper conductor layer which are bonded together by a dielectric insulating layer. The load beam and flexure are formed from the stainless steel layer by a photolithographic chemical etching process. The integrated leads are formed from the conductor and insulating layers by a similar process.

The Bennin et al. U.S. Pat. No. 5,491,597 discloses a head suspension which is assembled from a load beam and a gimbal-interconnect assembly. The gimbal-interconnect assembly is etched from a layer of conductive spring material, coated with an insulating dielectric and mounted to the load beam.

Another wireless suspension design makes use of a flex circuit mounted to a load beam. The flex circuit structure includes electrical leads encapsulated in a flexible and insulating film. The flex circuit is mounted, typically by adhesive, to the load beam. A flex circuit suspension is disclosed, for example, in PCT Publication No. WO 96/37883.

There remains, however, a continuing need for improved integrated lead suspension technologies. To be commercially viable, any such technology should enable the efficient manufacture of head suspensions having high quality mechanical and electrical characteristics.

SUMMARY OF THE INVENTION

The present invention is an improved lead structure for head suspensions of the type having a mounting region on a proximal end, a head-receiving flexure on a distal end, a rigid region and a spring region between the rigid region and the mounting region. Among other characteristics, the lead structure is a high performance member which can be efficiently fabricated and assembled onto the head suspensions.

One embodiment of the lead structure includes a conductor layer, a metal base layer below at least portions of the conductor layer and adapted to be mounted to the head suspension, and a dielectric insulating layer for bonding the conductor layer to the metal base layer. The conductor layer comprises a plurality of transversely spaced, elongate electrical conductors adapted to extend between at least the flexure and mounting region of the head suspension. The conductor layer includes a head bonding terminal section on a distal end for electrical interconnection to a head mounted to the flexure, a flexure-traversing section, a rigid region-traversing section, a spring region-traversing section, and a terminal section on a proximal end for electrically coupling signals between the lead structure and external circuitry.

DETAILED DESCRIPTION OF THE PREFERRED EMBODIMENTS

Figure 1:
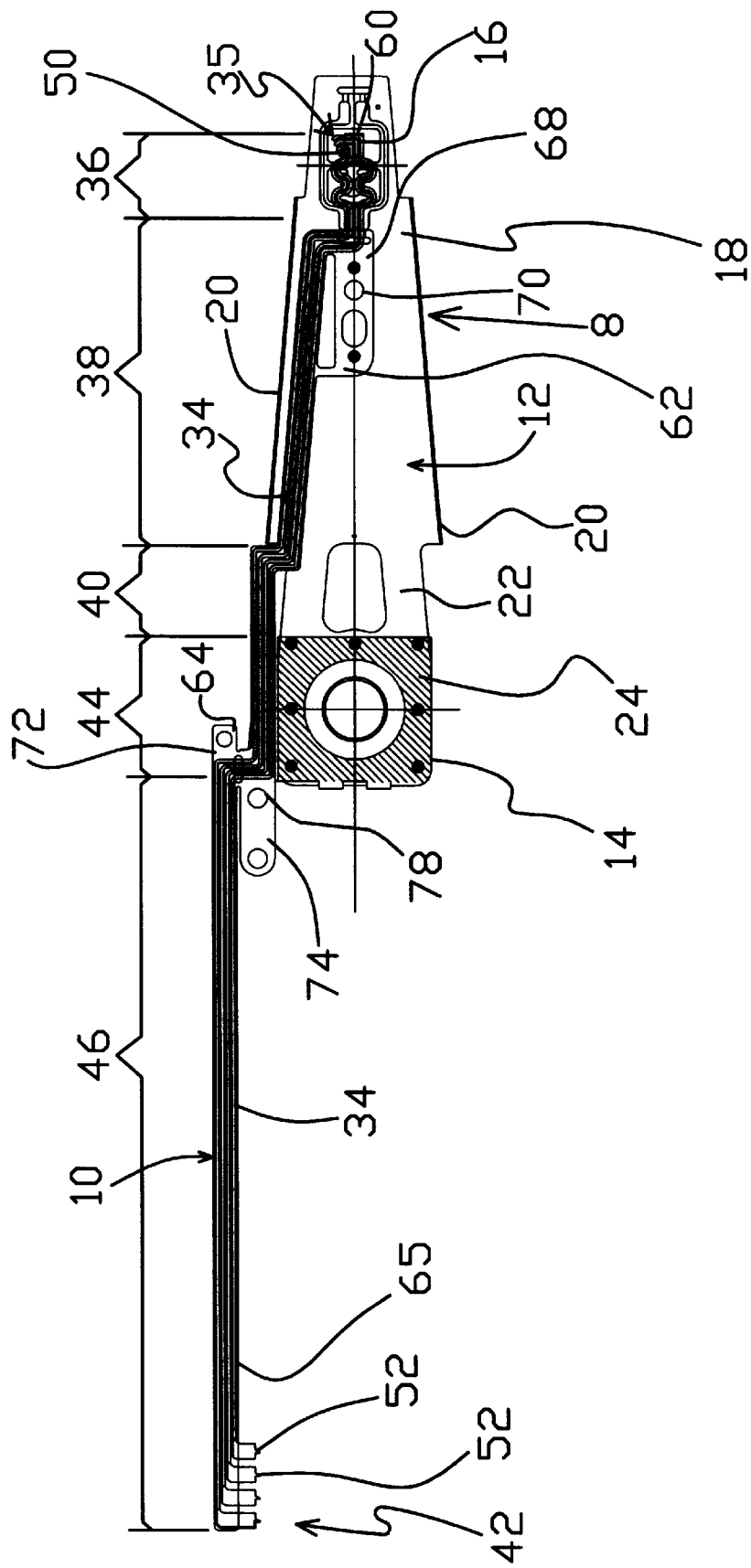
FIG. 1 is a top view of a head suspension with a lead structure in accordance with the present invention mounted thereto.

A lead structure 10 in accordance with the present invention is shown mounted to a head suspension 8 in FIG. 1. Head suspensions such as 8 are well known and commercially available from a number of sources including Hutchinson Technology Incorporated of Hutchinson Minn., the assignee of the present invention. In the embodiment shown, head suspension 8 includes a stainless steel load beam 12 having a mounting region 14 at its proximal end, an integral gimbal or flexure 16 at its distal end, a relatively rigid region 18 with a pair of opposed stiffening rails 20, and a spring region 22 between the mounting region and rigid region. A base plate 24 is welded to the mounting region 14. Although not shown, the flexure 16 is adapted to have a head slider adhesively bonded thereto.

Figure 2:
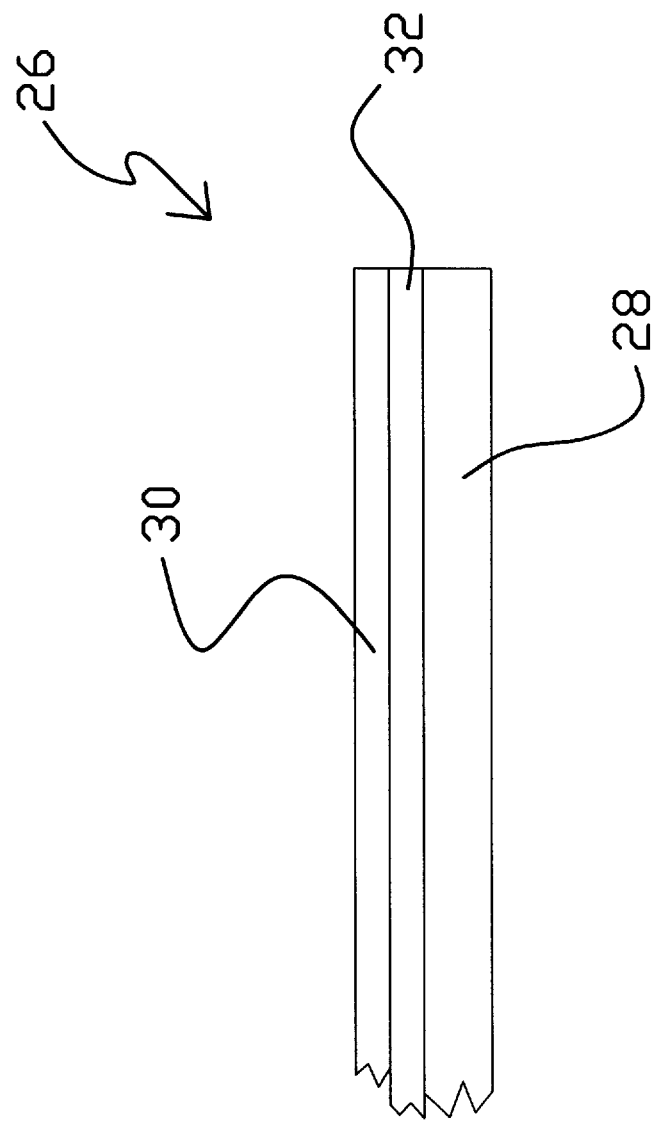
FIG. 2 is a side view of a head section of a laminated material sheet from which the lead structure shown in FIG. 1 can be fabricated.
Figure 3:
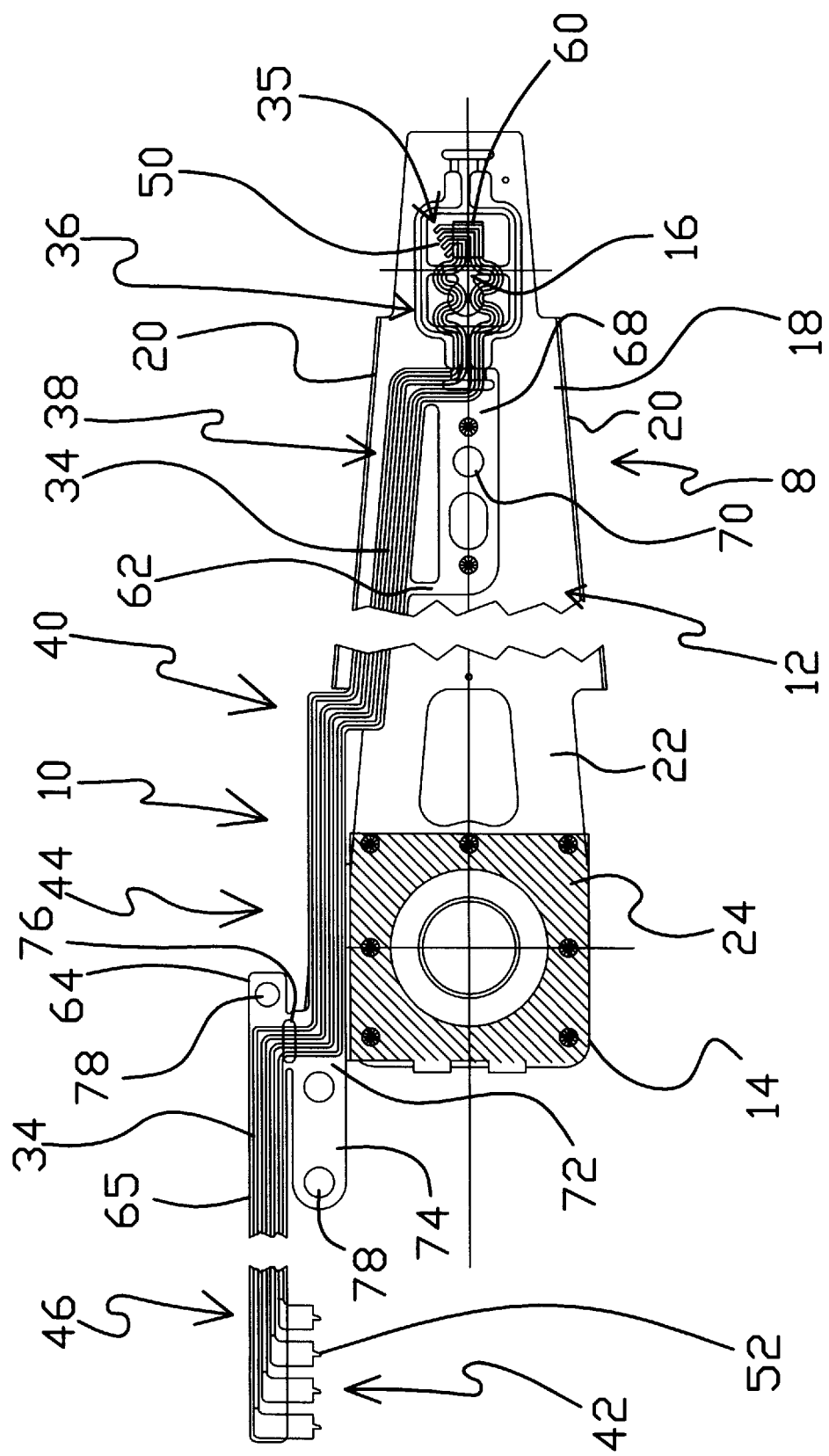
FIG. 3 is a top view of a suspension with a lead structure in accordance with the present invention mounted thereto, with portions thereof broken away.
Figure 4:
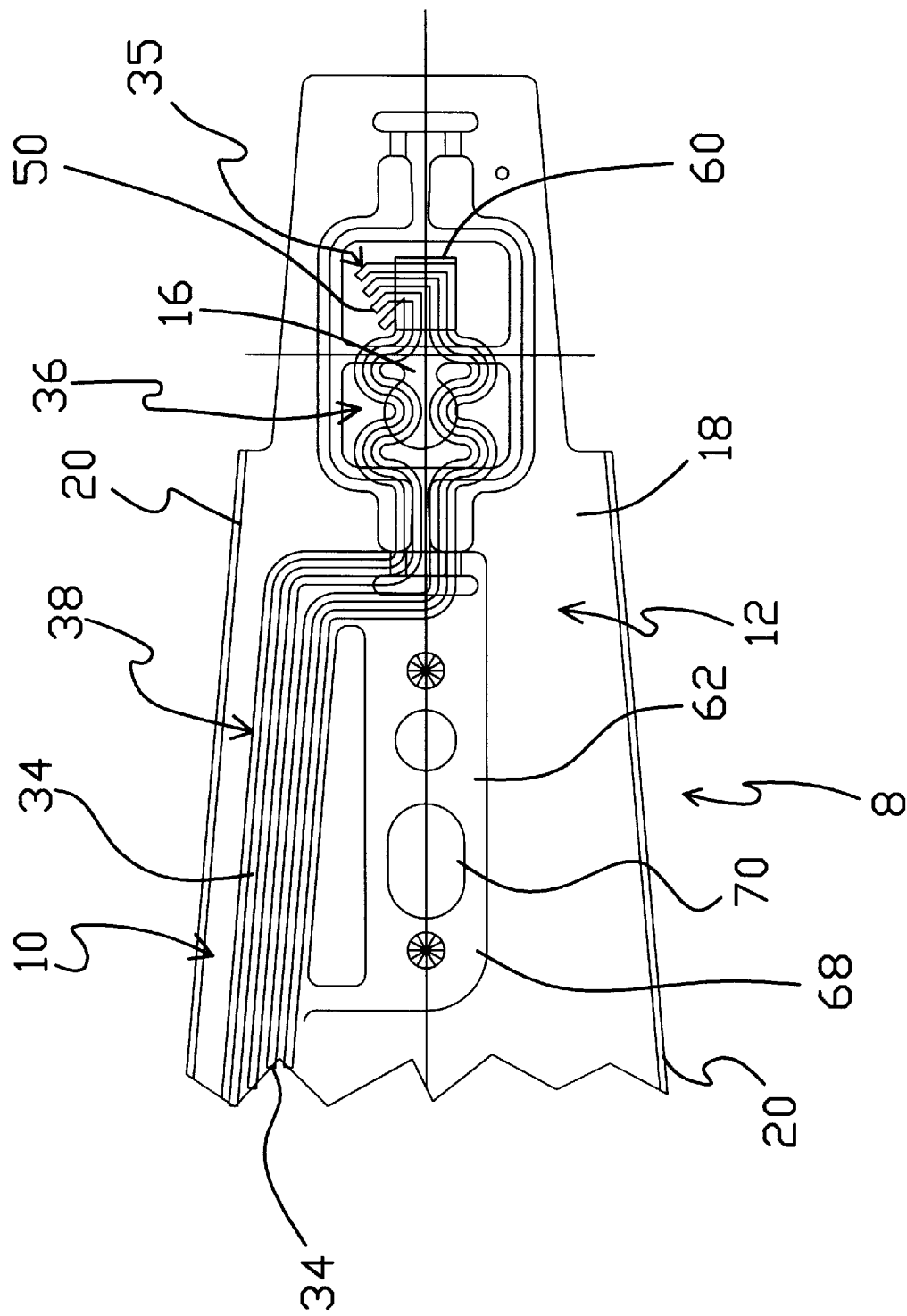
FIG. 4 is a detailed view of the distal end portion of the head suspension shown in FIG. 1.
Figure 5:
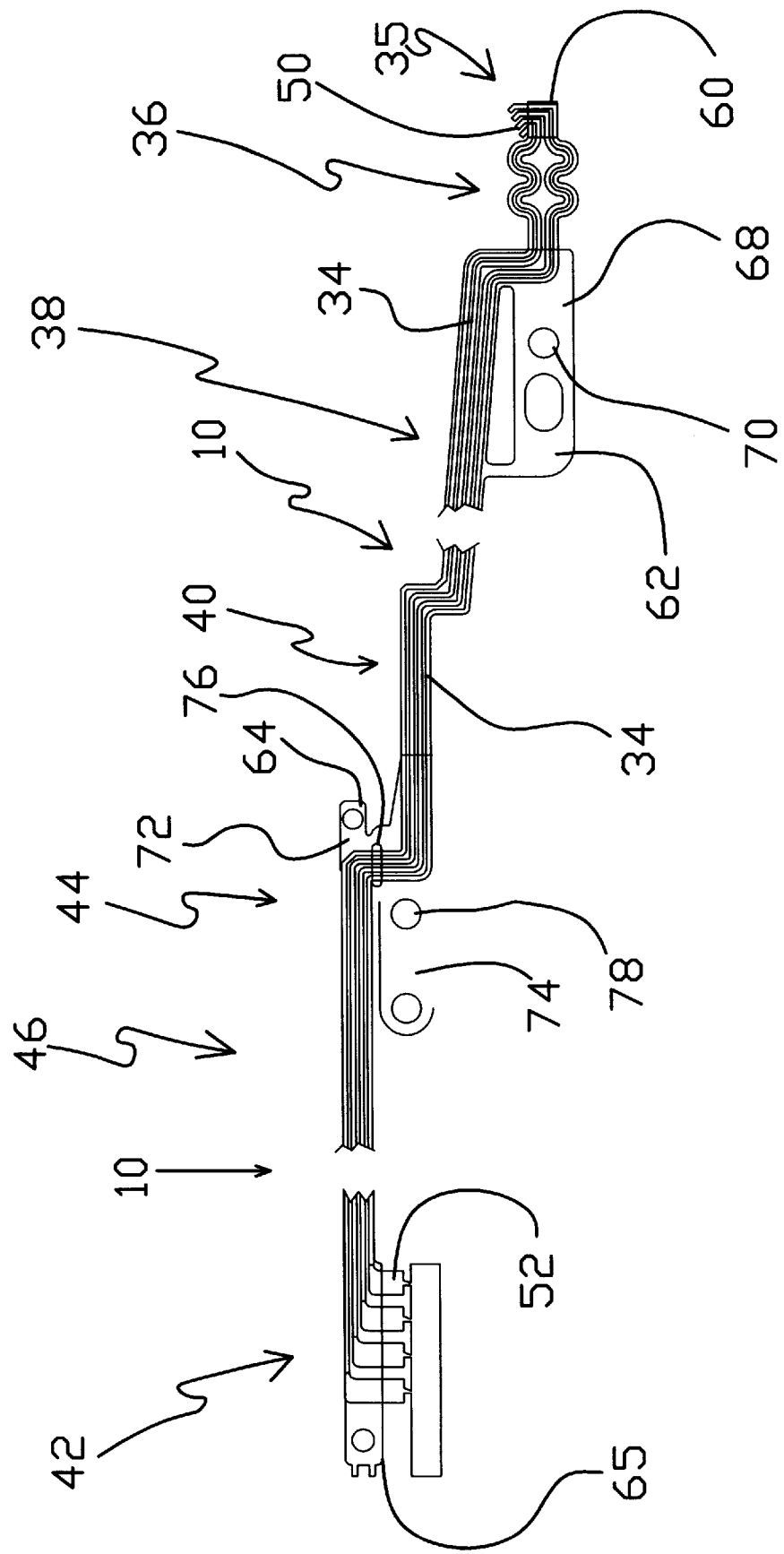
FIG. 5 is a top view of the lead structure shown in FIG. 3, with portions thereof broken away.
Figure 6:
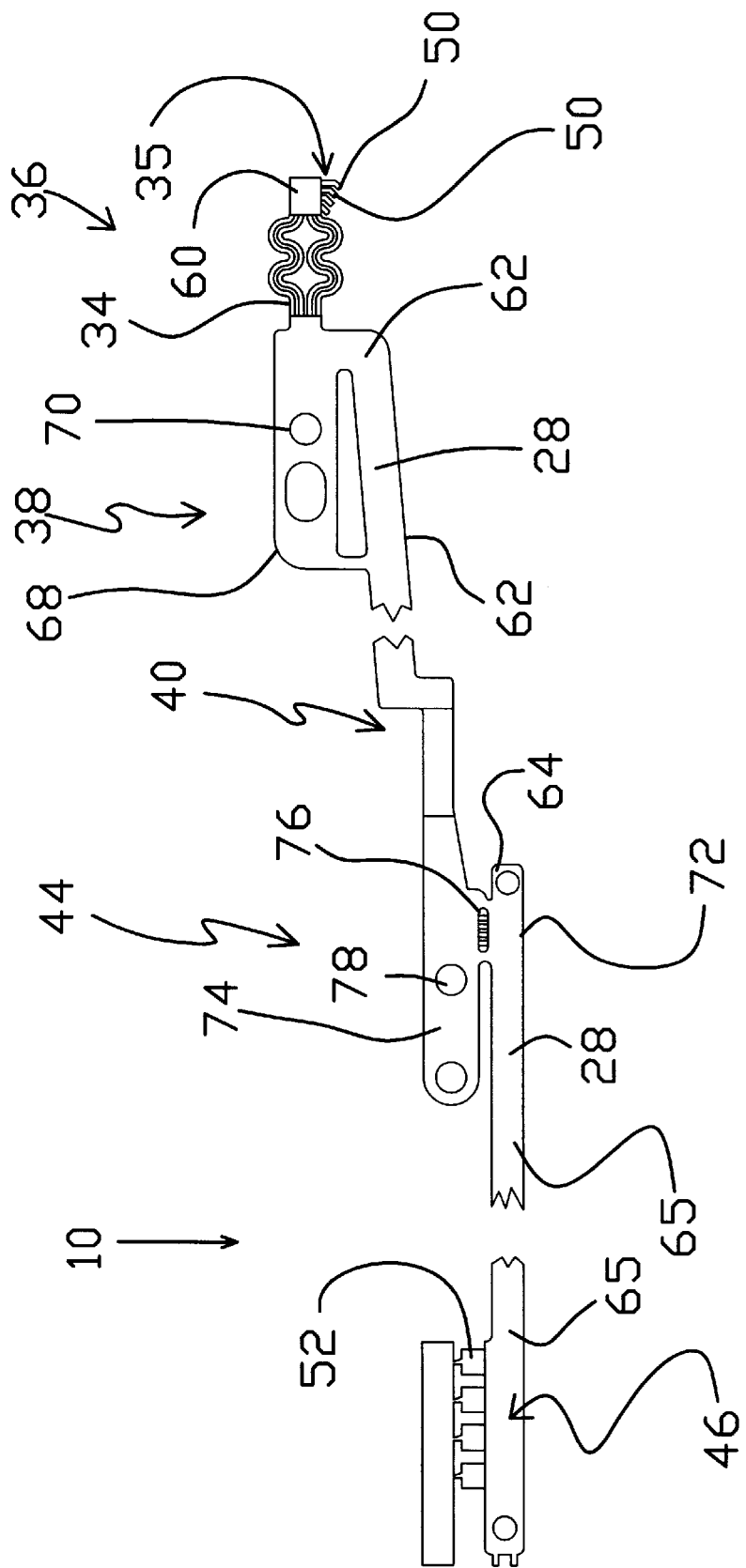
FIG. 6 is a bottom view of the lead structure shown in FIG. 3, with portions thereof broken away.

In the preferred embodiment described herein, the lead structure 10 is formed from a laminated material sheet 26 such as that shown in FIG. 2. Laminated sheet 26 includes a metal base layer 28 and a conductor layer 30 which are separated from one another and bonded together by a dielectric insulating layer 32. Laminated sheets such as 26 are commercially available from a number of sources including Roger Corporation. In one embodiment, base layer 28 is a stainless steel layer having a thickness of about 18 micrometers to 25 micrometers. Conductor layer 30 is a layer of C7025 copper alloy having a thickness of about 10 micrometers to 18 micrometers. Insulating layer 32 is a polyimide layer having a thickness of about 10 micrometers to 18 micrometers. Conventional photolithographic etching processes can be used to fabricate the lead structure 10 from laminated sheet 26.

Lead structure 10 can be described in greater detail with reference to FIGS. 1 and 3–6. As shown, the lead structure 10 includes a plurality (four in the illustrated embodiment) of transversely spaced, generally parallel elongate leads or conductors 34 which are formed from the conductor layer 30 of laminated sheet 26. Conductors 34 extend between the flexure 16 and at least the mounting region 14 of the head suspension 8, and include a head bonding terminal. section 35 at the distal end, a flexure-traversing section 36, a rigid region-traversing section 38, a spring region-traversing section 40, and a terminal pad section 42 on its proximal end. The illustrated embodiment of lead structure 10 also includes a mounting region-traversing section 44 and a tail 46 between the mounting region-traversing section and terminal pad section 42. Head bonding terminal section 35 includes a plurality of terminals 50, one on the end of each conductor 34. Terminals 50 are adapted to be electrically interconnected to electrical terminals of the head slider (not shown) mounted to the flexure 16. Similarly, terminal pad section 42 includes a terminal 52 on each conductor 34 for electrically interconnecting the conductors to electronic circuitry of the disk drive (not shown) in which the head suspension 8 is incorporated.

Flexure-traversing section 36 of the conductor layer 30 extends between the flexure 16 and rigid region 18 of head suspension 8, and in the embodiment shown is configured to traverse this distance along a path above the load beam 12. Rigid region-traversing section 38 of the conductor layer 30 extends between the flexure 16 and spring region 22 of the head suspension 8, and in the embodiment shown is configured to traverse this distance along a path above the load beam 12. Spring region-traversing section 40 of the conductor 30 extends between the rigid region 18 and mounting region 14 of the head suspension 8, and in the embodiment shown is configured to traverse this distance along a path off the load beam 12 on the side of the spring region. The mounting region-traversing section 44 of the conductor layer 30 is configured to traverse a path above the mounting region 14 of the load beam 12 in the embodiment shown. Tail 46 of conductor 30 extends off the load beam 12 at the mounting region 14, typically in a direction toward the circuitry or connectors (not shown) to which terminal pad section 42 is to be electrically interconnected.

Lead structure 10 is constructed with the metal base layer 28 below at least portions of the conductor layer 30 to enable the lead structure to be mounted to head suspension 8. In the embodiment shown, the metal base layer 28 includes a flexure mounting section 60 below a portion of the flexure-traversing section 36 of conductor layer 30, a rigid region mounting section 62 below the entire length of the rigid region-traversing section 38 of the conductor layer, a mounting region mounting section 64 below a portion of the mounting region-traversing section 44 of the conductor layer. At least portions of the spring region-traversing section 40 of conductor layer 30, and in the embodiment shown the entire length of the spring region-traversing section of the conductor layer, are free from (i.e., do not have) the metal base layer 28 below them. Portions of the flexure-traversing section 36 and the mounting region-traversing section 44 of the conductor layer 30 are also free from the metal base layer 28 in the embodiment shown. The entire length of the tail 46 of conductor layer 30 is backed by a tail section 65 of the metal base layer 28 in the embodiment shown.

The flexure mounting section 60 of metal base layer 28 can include mounting tabs (not shown) which extend transversely from below the opposite sides of the conductor layer 30. In addition to extending the fill width and length of the rigid region-traversing section 38 of conductor layer 30, rigid region mounting section 62 of metal base layer 28 includes a generally rectangularly shaped mounting tab 68. Mounting tab 68 extends beyond the conductor layer 30 and includes several tooling alignment holes 70 which can be used to register the tab with features on the load beam 12. The mounting region mounting section 64 of metal base layer 28 includes a mounting tab 72 which is generally rectangularly shaped and has an extension 74 configured to extend from the mounting region 14 of the load beam, away from the spring region 22. Mounting tab 72 extends beyond the conductor layer 30 and includes a central aperture 76 across which the conductor layer extends, and several tooling alignment holes 78 which can be used to register the tab with features on the load beam 12.

Insulating layer 32 is located between and electrically isolates the flexure mounting section 60, rigid region mounting section 62, mounting region mounting section 64 and tail section 65 of the metal base layer 28 and adjacent sections of conductor layer 30. The portions of the spring region-traversing section 40 of the conductor layer 30 which are free from (i.e., not backed by) the metal base layer 28 include the insulating layer 32 in the embodiment shown, while the portions of the flexure-traversing section 36, terminals 50 and terminals 52 of the unbacked conductor layer do not include the insulating layer. In other embodiments, the insulating layer 32 can be removed from or included on these unbacked portions of the conductor layer 30.

As described above, lead structure 10 can be fabricated from a laminated material sheet 26 using conventional photolithographic chemical etching processes. After being fabricated, the lead structure can be formed to a high degree of accuracy to a topology corresponding or mating to the head suspension 8. The head bonding terminal section 35 and terminal pad section 42 can be formed to have topologies and/or orientations corresponding to those of the structures to which they are to be attached. After the lead structures 10 are fabricated they can be positioned on conventional head suspensions 8 for which they have been configured, aligned with the head suspension structure through the use of alignment holes 70 and 78, and the mounting sections of the metal base layer 28 bonded to the adjacent sections of the head suspension. In preferred embodiments, the mounting section 60 and mounting tabs 68 and 72 are laser welded to the load beam. The terminals 50 of the head bonding terminal section 35 can be mechanically and electrically attached to the head slider (not shown) and its terminals before or after the lead structure 10 is attached to the head suspension 8.

Lead structure 10 offers a number of important advantages, particularly with respect to the use of flex circuits on head suspensions. All important mechanical performance-related head suspension characteristics (e.g., the spring region, rigid region and flexure) can be provided primarily by the head suspension itself. The lead structure can therefore be designed for optimized electrical and other characteristics, and provides relatively little contribution to the mechanical characteristics of the head suspension. The lead structures are efficient to fabricate, at least in part due to the fact that they can be manufactured in relatively high density spacing on sheets of laminated material to reduce material waste. They can also be attached to the head suspensions relatively late in the assembly process to minimize cost and yield considerations.

The lead structure can be manufactured by photolithographic etching processes with relatively high tolerances between the stainless steel base alignment holes and conductors. The lead structure can therefore be positioned on the head suspension, and the head bonding terminal section registered to the flexure, to a high degree of accuracy. This assembly process can be performed in volume using automated equipment, and for these and other reasons is relatively fast and efficient. No adhesive curing time is required to weld the lead structure to the load beam. The lead structures can also be stacked to accommodate head sliders requiring greater numbers of leads. The stainless steel backing enhances the structural integrity of the conductors, thereby helping to ensure that they maintain their position on the head suspension.

What is claimed is:

1. A lead structure adapted for attachment to a head suspension of the type having a mounting region on a proximal end, a head-receiving flexure on a distal end, a rigid region and a spring region between the rigid region and the mounting region, the lead structure including:
    a conductor layer comprising a plurality of transversely spaced, elongate electrical conductors adapted to extend between at least the flexure and mounting region of the head suspension, the conductor layer including:
        a head bonding terminal section on a distal end for electrical interconnection to a head mounted to the flexure;
        a flexure-traversing section;
        a rigid region-traversing section;
        a spring region-traversing section; and
        a terminal section on a proximal end for electrically coupling signals between the lead structure and external circuitry;
    a metal base layer below at least portions of the conductor layer and adapted to be mounted to the head suspension, wherein said metal base layer includes at least one mounting tab; and
    a dielectric insulating layer for bonding the conductor layer to the metal base layer.

2. The lead structure of claim 1 wherein the metal base layer includes a flexure mounting section below the flexure-traversing section of the conductor layer and adapted to be mounted to the flexure of the head suspension.

3. The lead structure of claim 2 wherein the flexure mounting section of the metal base layer further includes a mounting tab extending beyond at least a portion of the flexure-traversing section of the conductor layer.

4. The lead structure of claim 1 wherein the metal base layer includes a rigid region mounting section below the rigid region-traversing section of the conductor layer and adapted to be mounted to the rigid region of the head suspension.

5. The lead structure of claim 4 wherein the rigid region mounting section of the metal base layer further includes a mounting tab extending beyond at least a portion of the rigid region-traversing section of the conductor layer.

6. The lead structure of claim 1 wherein the structure is free of the metal base layer below at least portions of the spring region-traversing section of the conductor layer.

7. The lead structure of claim 1 wherein the structure is free of the metal base layer below at least portions of the flexure-traversing section of the conductor layer.

8. The lead structure of claim 1 wherein:
    the conductor layer further includes a mounting region section; and
    the metal base layer further includes a mounting region section below the mounting region section of the conductor layer and adapted to be mounted to the mounting region of the head suspension.

9. The lead structure of claim 8 wherein the mounting region section of the metal base layer further includes a mounting tab extending beyond at least a portion of the mounting region section of the conductor layer.

10. The lead structure of claim 1 wherein the conductor layer further includes a tail section for extending beyond the mounting region of the head suspension, and wherein the terminal section is on a proximal end of the tail section.

11. The lead structure of claim 10 wherein the metal base layer further includes a tail section adjacent the tail section of the conductor layer.

12. The lead structure of claim 1 and further including a suspension, and wherein the lead structure is mounted to the head suspension.

13. The lead structure of claim 12 and further including welds for mounting the metal base layer of the lead structure to the head suspension.

14. A lead structure adapted for attachment to a metal head suspension of the type having a mounting region on a proximal end, a head-receiving flexure on a distal end, a rigid region and a spring region between the rigid region and the mounting region, the lead structure including:
    a conductor layer comprising a plurality of transversely spaced, elongate electrical conductors adapted to extend between at least the flexure and mounting region of the head suspension, the conductor layer including:
        a head bonding terminal section on a distal end for electrical interconnection to a head mounted to the flexure;
        a flexure-traversing section;
        a rigid region-traversing section;
        a spring region-traversing section;
        a mounting region section; and
        a terminal section on a proximal end for electrically coupling signals between the lead structure and external circuitry;
    a metal base layer below at least portions of the conductor layer and adapted to be mounted to the head suspension, including:
        at least one mounting tab;
        a flexure mounting section below the flexure-traversing section of the conductor layer and adapted to be mounted to the flexure of the head suspension;
        a rigid region mounting section below the rigid region-traversing section of the conductor layer and adapted to be mounted to the rigid region of the head suspension; and a mounting region mounting section below the mounting region section of the conductor layer and adapted to be mounted to the mounting region of the head suspension; and a dielectric insulating layer for bonding the conductor layer to the metal base layer.

15. The lead structure of claim 14 wherein:

the flexure mounting section of the metal base layer includes a mounting tab extending beyond at least a portion of the flexure-traversing section of the conductor layer;

the rigid region mounting section of the metal base layer includes a mounting tab extending beyond at least a portion of the rigid region-traversing section of the conductor layer; and the mounting region mounting section of the metal base layer includes a mounting tab extending beyond at least a portion of the mounting region portion of the conductor layer.

16. The lead structure of claim 15 wherein at least portions of the spring region-traversing section of the conductor layer is free from the metal base layer.

17. The lead structure of claim 15 wherein at least portions of the flexure region-traversing section of the conductor layer is free from the metal base layer.

18. The lead structure of claim 15 wherein the conductor layer further includes a tail section for extending beyond the mounting region of the head suspension, and wherein the terminal section is on a proximal end of the tail section.

19. The lead structure of claim 18 wherein the metal base layer further includes a tail section adjacent to the tail section of the conductor layer.

20. The lead structure of claim 19 and further including a head suspension, and wherein the mounting tabs of the lead structure are welded to the head suspension.

21. The lead structure of claim 14 wherein at least portions of the spring region-traversing section of the conductor layer is free from the metal base layer.

22. The lead structure of claim 21 wherein the conductor layer further includes a tail section for extending beyond the mounting region of the head suspension, and wherein the terminal section is on a proximal end of the tail section.

23. The lead structure of claim 22 wherein the metal base layer further includes a tail section adjacent to the tail section of the conductor layer.

24. The lead structure of claim 14 and further including a head suspension, and wherein the mounting tabs of the lead structure are welded to the head suspension.

* * * * *